United States Patent [19]

Deroux-Dauphin

[11] Patent Number: 4,992,897
[45] Date of Patent: Feb. 12, 1991

[54] DEVICE FOR READING AND WRITING ON A MAGNETIC MEDIUM

[75] Inventor: Patrice Deroux-Dauphin, Saint Egreve, France

[73] Assignee: Commissariat A L'Energie Atomique, Paris, France

[21] Appl. No.: 337,289

[22] Filed: Apr. 13, 1989

[30] Foreign Application Priority Data

Apr. 15, 1988 [FR] France .................................. 88 05015

[51] Int. Cl.$^5$ .............................................. G11B 5/60
[52] U.S. Cl. ..................................... 360/103; 360/126
[58] Field of Search .......................... 360/103, 125-126

[56] References Cited

U.S. PATENT DOCUMENTS

| 3,564,522 | 2/1971 | Stevens, Jr. |
| 3,601,871 | 8/1971 | Pierce |
| 3,672,043 | 6/1972 | Trimble et al. |
| 4,698,708 | 10/1987 | Lazzari ............................... 360/103 |
| 4,809,103 | 2/1989 | Lazzari ............................... 360/103 |

FOREIGN PATENT DOCUMENTS 0262028 3/1988 France .
879600 10/1961 United Kingdom .

OTHER PUBLICATIONS

Patent Abstracts of Japan, vol. 1, No. 103, Sep. 13, 1977, p. 3310 E 77 (Hitachi Seisakusho K.K.).
Patent Abstracts of Japan, vol. 11, No. 299 (P-621) Sep. 29, 1987.
Patent Abstracts of Japan, vol. 2, No. 56, Apr. 25, 1978, p. 1427 E 78.

Primary Examiner—A. J. Heinz
Attorney, Agent, or Firm—Nutter, McClennen & Fish

[57] ABSTRACT

A device for reading and writing of information on a magnetic medium such as a disk or tape comprises at least one reading and writing head placed on a base having a catamaran type profile. The head is composed of a magnetic circuit (a winding on a medium) self-positioned and welded to the walls of a hole made in the base, a flow concentrator in contact with the extremities of the magnetic circuit and a pole piece made up of two magnetic parts separated by a magnetic spacer. The pole piece is positioned opposite to the track of the magnetic medium.

12 Claims, 4 Drawing Sheets

DEVICE FOR READING AND WRITING ON A MAGNETIC MEDIUM

FIELD OF THE INVENTION

The present invention concerns a device for writing and reading on a magnetic medium and its production method. In particular, it applies to the reading and writing on hard magnetic disks used in computers.

BACKGROUND OF THE INVENTION

Currently, an elementary magnetic storage cell on a medium in the form of a disk or tape requires a superficial area of about 100 to 120 square micrometers. One cell is described by the width of the recording track (usually 20 micrometers) and by the number of bits per unit of length.

Elementary cells with, a superficial area of 0.5 to 25 square micrometers and a surface density almost equal to 1 bit per square micrometer are currently envisaged. The reading and writing of information on such cells necessitates new type of magnetic heads offering improved performances.

According to the prior Art, three different types of heads currently exist : the first type is the normal type relating to monolithic or solid-state heads, the second is formed by heads made up of thin layers and the third corresponds to hybrid or composite heads.

Owing to the magnetic volume involved, mono and mini-monolithic heads generate significant noise and possess poor resolution. Their method of production limits access to large densities and renders difficult passage to densities greater than 1200 TPI (tracks per inch).

Heads consisting of thin layers have many advantages, but they are costly and complex to produce and volume production remains quite small.

Only hybrid or composite heads allow access to large recording densities while keeping production costs relatively low. Their current performances fall between those of the other types of heads.

SUMMARY OF THE INVENTION

The object of the present invention is to have these hybrid heads provide performances equal to or better than those of thin-layered heads. A writing and reading head according to the invention in fact makes it possible to use tracks with a width of from 1 to 10 micrometers while retaining a high output voltage and a low resonance frequency.

The present invention also concerns the method for embodying the head, said method combining production techniques similar to those involved in microelectronics and micromechanics. This method allows for the use of self-alignment and centering techniques authorising collective production implementation of magnetic heads and also makes it possible to reduce production costs and obtain improved performances.

According to the invention, the writing and reading head is constituted by a directly mounted magnetic circuit including a winding wound onto a medium made of a magnetic material. The shape of this medium is similar to that of a horseshoe. The extremities of this medium are in contact with a first thin magnetic layer serving as a flow concentrator. This flow concentrator has a shape whose smallest width corresponds to the width of the track. A second magnetic layer separated from the flow concentrator by a thin non-magnetic layer is directly opposite the track. This second layer is divided in two by a spacer serving as a reading and writing pole piece.

The technology used to produce the device according to the invention makes it possible to control the width of the reading head. The assembling of the various elements is simple, easy and does not require any end of passage adjustment owing to self-alignment technologies. The mechanical stability of the device is sound, the various vibrations occuring during its use not being significant to any extent.

More precisely, the present invention concerns a device for the reading and writing on a magnetic medium. This device includes at least one magnetic writing and reading head embodied on a monocrystalline silicon base, said base having a catamaran-type profile and one face intended to be positioned opposite said magnetic medium and a rear face, said front and rear faces being oriented according to the crystallographic plane 100 of the silicon.

The magnetic reading and writing head comprises:

a magnetic circuit placed in a hole made in the rear face of the base, said hole having the shape of a box with walls inclined according to the crystallographical planes 111 of the silicon, one stop with walls inclined according to the crystallographical planes 111 and being reserved at the bottom of the hole, two electric connections of the magnetic circuit being flush with the rear face of the base, the magnetic circuit being fixed into the box by means of a material suitable for welding the magnetic circuit to the box, a flux concentrator in contact with the extremities of the magnetic circuit, a writing and reading pole piece separated from the flux concentrator by a non-magnetic conductive coating, said pole piece being flush with the front face of the base. A material, suitable for keeping and fixing the flow concentrator and pole piece on the base, is in contact with a mask partly covering the non-magnetic conductive coating, said mask delimiting one localization of the reading and writing pole piece.

The flux concentrator is constituted by a coating made of a magnetic material, said coating being separated into two parts by a wall made of a non-magnetic material.

Preferably, the coating is made of FeSiAl (Sendust) and the non-magnetic material is $SiO_2$.

As regards the coating, it is also possible to use CoZr or any other material having high magnetic permeability.

As a non-magnetic material, it is also possible to use aluminum or any other material having non-magnetic properties.

The reading and writing pole piece is constituted by a layer made of a magnetic material, said layer being separated into two parts by a non-magnetic spacer.

Advantageously, the magnetic parts of the pole piece are made of FeNi and the non-magnetic spacer is made of $SiO_2$.

It is also possible to use other materials as a spacer, said materials being aluminum or any other non-magnetic material.

The rear face of the base is covered with a protective coating made of an insulating material. Openings are provided around the electric connections.

Preferably, this coating is made of aluminum. It is also possible to use $SiO_2$ or any other insulating material suitable for forming a protective coating.

The material suitable for welding the magnetic circuit to the box and the material suitable for maintaining and securing the flow concentrator and pole part are selected from meltable glass and duroplastic polymers.

Preferably, the mask is made of $SiO_2$; it is also possible to use other insulants.

The present invention also relates to a method for producing the reading and writing device. The various operations of the method are carried out on a monocrystalline silicon plate having one front face and one rear face both corresponding to the front and rear faces of the base of the device. The faces are orientated according to the crystallographical plane 100 of the silicon. The method is a collective or multiple method: about 300 bases per silicon plate are produced.

On the rear face of the plate:

a reticular engraving is made so as to hollow out a hole in the shape of a box suitable for receiving a magnetic circuit. One stop is provided at the bottom of the hole. This reticular engraving is a chemical engraving. The front and rear faces of the plate are oriented according to the crystalline orientation plane 100. The chemical engraving hollows out the silicon according to the orientation planes 111. The walls of the box are thus slanted 54°7 with respect to the front face of the plate;

said magnetic circuit is introduced into the box. This magnetic circuit is composed of two parts : a winding whose extremities are electrical connections and a support of the winding (torus) made of a magnetic material, for example ferrite or any other material having good magnetic properties. The support has a shape similar to a horseshoe. The particular shape of the box, its slanted walls and the stoP allow for self-positioning of the magnetic circuit inside the box.

The magnetic circuit is fixed inside the box by means of a material suitable for welding the circuit to the box. This material suitable for welding is preferably made of meltable glass. This can also be a duroplastic polymer.

One layer of an insulating material is deposited by providing a space around the electric connections. This layer, apart from the fact that it is insulating, protects the base. The connections allow for connection to external electric wires by, for example, glass-$SiO_2$ weldings.

Preferably, the material deposited is aluminum and may also be $SiO_2$.

An engraving is made on the front face of the plate by lithographical methods known to experts in this field (for example, reticular engraving). By means of this engraving, the magnetic extremities of the magnetic circuit are laid open. A silicon projection, prolonging the stop located at the bottom of the box, is reserved.

At the bottom of the engraving, a flux concentrator is embodied. To achieve this, a deposit of a magnetic material is effected by means of cathodic evaporation, for example. This deposit is then engraved, which firstly makes it possible to define the shape of the concentrator, this shape having a smaller width corresponding to the width of a magnetic track, and secondly to divide into two parts the deposit of the magnetic material and to provide a space between these two parts. A non-magnetic material, such as $SiO_2$, is then deposited into this space. It is also possible to use aluminum.

The widest parts of the flow concentrator are in contact with the magnetic extremities of the magnetic circuit, the part with the smallest width resting on the silicon projection.

A non-magnetic conductive deposit is formed on the flow concentrator.

This non-magnetic conductive material may be copper or tungsten.

Then a deposit serving as a mask is formed on the flux concentrator. This mask partly covers the conductive material deposited on the flow concentrator and determines the placement of a reading and writing pole piece.

This mask can be made of an insulating material, such as $SiO_2$.

By means of electroplating a magnetic material, the reading and writing pole piece is embodied in the location reserved by the mask. This pole piece includes two magnetic parts made of FeNi, for example, separated by a non-magnetic spacer made of $SiO_2$, for example. The spacer may also be made of aluminum. The pole piece produced by lithographical techniques used moreover in microelectronics possesses high definition, these known techniques being properly controlled.

A deposit is effected of a layer of a material suitable for keeping and securing the flux concentrator and the pole piece on the plate. This material may be meltable glass or may also be a duroplastic polymer.

A mechanical honing is made of the front face so as to render it even.

The bases having the profile of a catamaran are engraved chemically.

The plate is cut in order to separate the different bases, each base including two writing and reading heads.

The various bases are ready for use and do not require any additional adjustment.

BRIEF DESCRIPTION OF THE DRAWINGS

The characteristics and advantages of the invention shall appear more readily from a reading of the following description, given by way of explanation and being in no way restrictive, with reference to the annexed drawings in which.

DETAILED DESCRIPTION OF THE PREFERRED EMBODIMENTS

Figure 1:
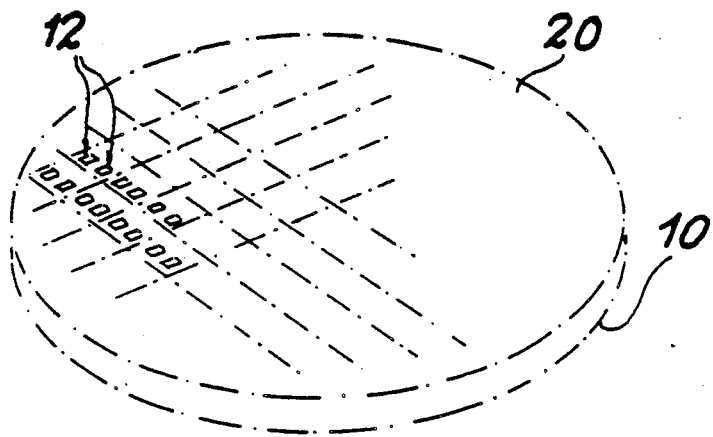
FIG. 1 diagrammatically represents a silicon plate intended for the production of devices according to the invention.

FIG. 1 diagrammatically represents a monocrystalline silicon plate intended for the production of devices according to the invention. About 300 reading and writing devices per plate are embodied. This plate has a thickness of, for example, 1.5 mm. This plate has a front face 10 and a rear face 20. The front face 10 corresponds to the face of the device intended to be opposite a magnetic medium. The front face 10 and rear face 20 are orientated according to the crystallographic plane 100 of the silicon. Box-shaped holes 12 are hollowed out by reticular engraving in the rear face 20.

Figure 2:
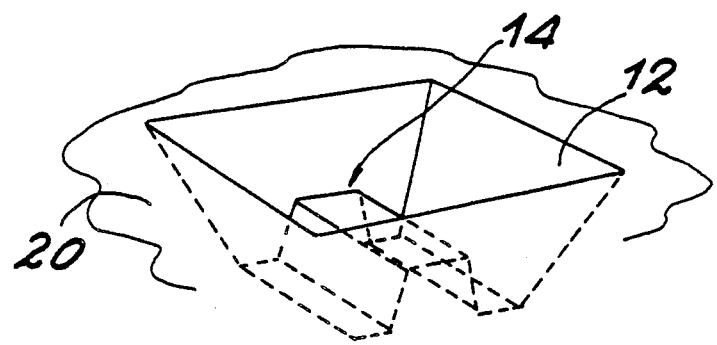
FIG. 2 shows in perspective and according to a longitudinal section, a box intended to receive a magnetic circuit, FIG. 3 diagrammatically represents a device according to the invention and shown as existing after working on the rear face of the silicon plate, FIG. 4A diagrammatically represents a section of the device according to the invention after embodiment of the flow concentrator, FIG. 4B diagrammatically represents a front view of the flow concentrator, FIGS. 5 to 7 diagrammatically represent the stages for the production of a reading and writing pole piece, FIG. 8 diagrammatically represents a longitudinal section of a device according to the invention.

FIG. 2 diagrammatically represents a perspective view of a hole 12 hollowed out in the rear face 20. The box-shaped hole 12 on the rear face 20 is 0.8 mm wide, 1.3 mm long and its depth is 1.3 mm, for example. A stop 14 with a height of between 60 and 160 micrometers rests on the bottom of the hole. The base of the stop has a width and length of between 30 and 100 micrometers. The walls of the hole 12 and the stop 14 are orientated according to the crystallographical orientation planes 111 of the silicon, in other words the walls are slanted with respect to the front face 10 and rear face 20 and present an angle of 54°7 with the plane of the front 10 and rear 20 faces.

Figure 3:
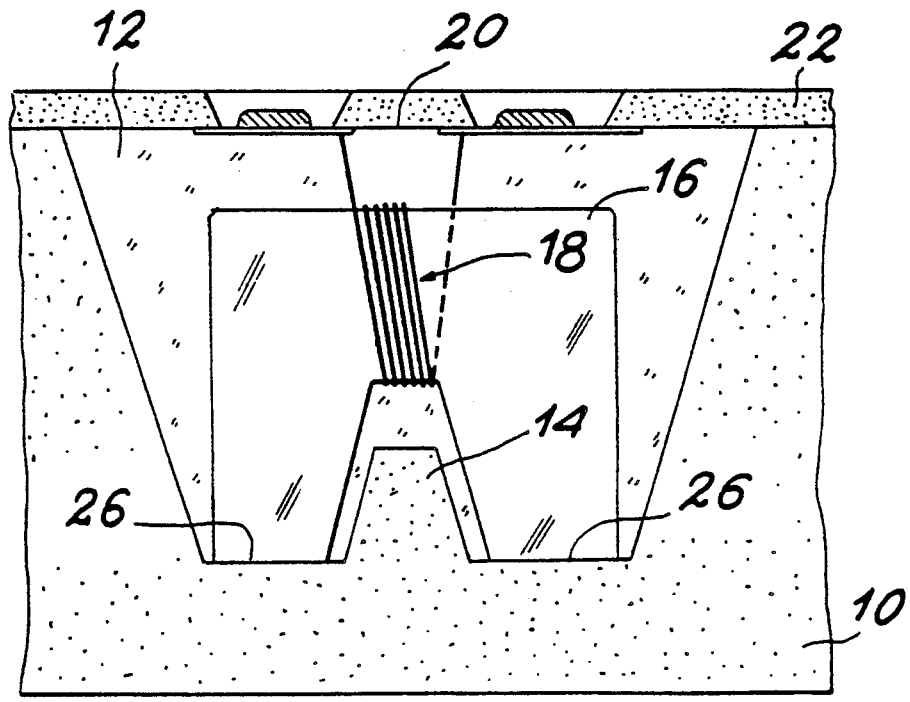

FIG. 3 diagrammatically represents a device according to the invention after working on the rear face 20 of the silicon plate. A magnetic circuit is deposited in the hole 12. This magnetic circuit comprises a support 16 in the shape of a horseshoe and a winding 18. This magnetic circuit is a built-in part produced elsewhere. This may be a circuit of the type produced by the Applied Magnetics Corporation company (AMC). The extremities of the support 16 are about 300 micrometers wide, for example. The support is made of ferrite or Sendust, for example. As the walls of the hole 12 are slanted and once a stop 14 is provided, the magnetic circuit comes to position itself inside the hole 12 ; the extremities of the support 16 of the magnetic circuit come to lie on the bottom of the hole 12.

The magnetic circuit is fixed to the hole 12 by means of a material suitable for welding the magnetic circuit to the hole 12, said material being, for example, meltable glass. In fact, the magnetic circuit is embedded in the meltable glass.

The extremities of the winding 18 are laid flat so as to allow for easy electric connection.

The method is collective and the magnetic circuits are deposited automatically and mechanically at the bottoms of the holes 12. Welding by meltable glass is effected for all the circuits in one single stage.

An aluminum layer 20, for example, is deposited on the rear face 20. This layer 22 with a thickness of, for example, 20 micrometers is insulating and protective.

Figure 4:
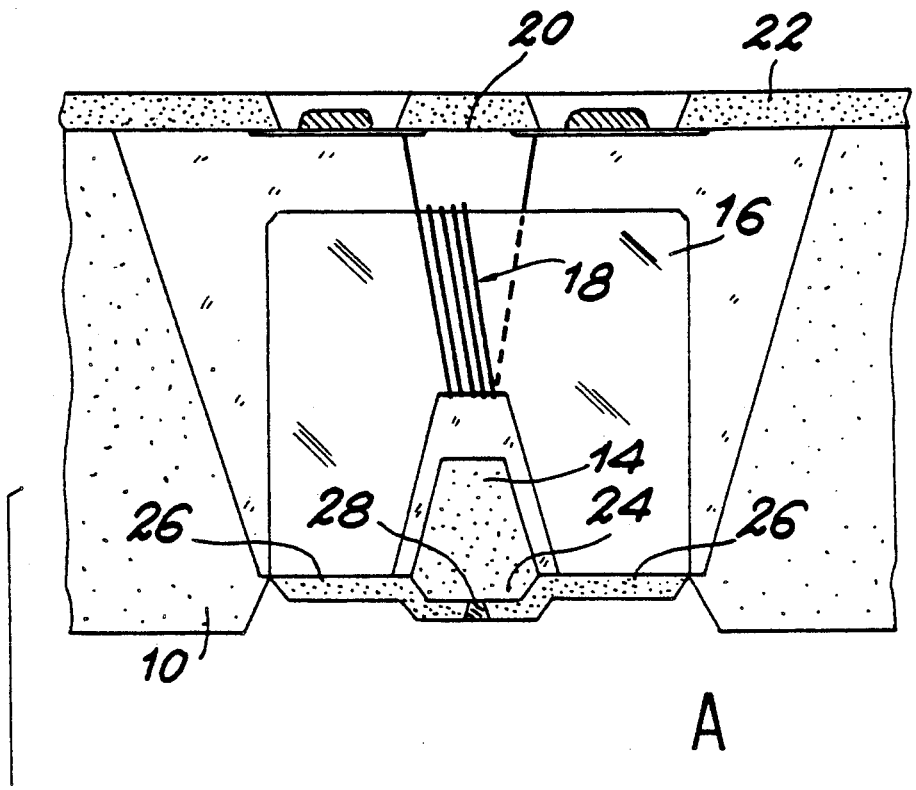
Figure 4:
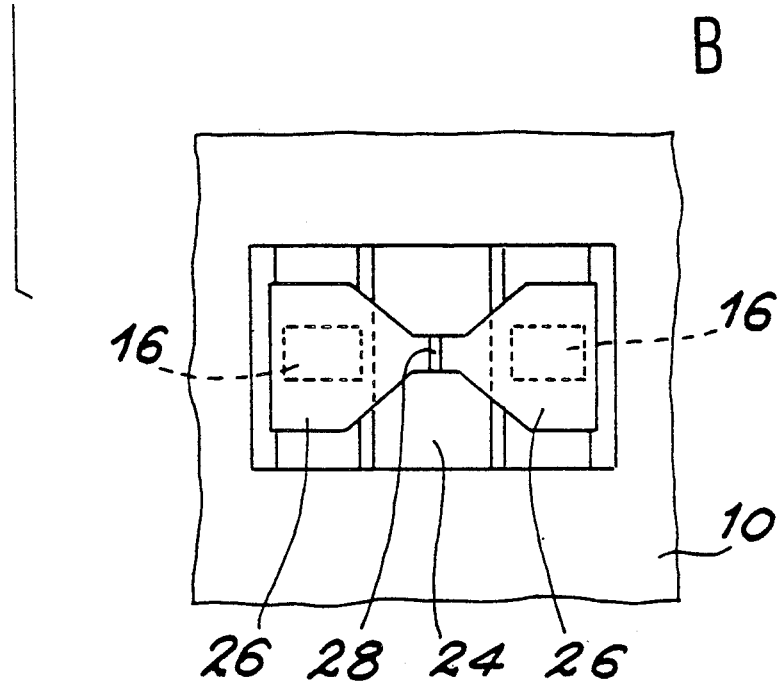

FIG. 4A diagrammatically represents a section of the device according to the invention after the embodiment of a flux concentrator on the front face 10. A reticular engraving is first of all carried out so as to lay open the extremities of the support 16 of the magnetic circuit. A projection 24 is fitted into the extension of the stop 14. The flux concentrator is composed of two parts 26 made of a magnetic material, such as FeSiAl. The two parts 26 are separated by a wall 28 made of a non-magnetic material, such as $SiO_2$.

The flux concentrator appears in the form of a layer with a thickness of, for example, 20 micrometers. The non-magnetic wall 28 has a width of between 5 and 20 micrometers. This width is to be optimized according to the type of magnetic circuit used.

The flux concentrator is embodied by depositing and engraving techniques fully recognised by experts in this field. The geometry of the flow concentrator is obtained by engraving.

FIG. 4B diagrammatically represents a front view of the flux concentrator.

On the projection 24 shown by the dotted lines, the flow concentrator presents its smallest width (about one micrometer or less). This width corresponds to the width of the magnetic track on which the information to be read/written is entered.

The flux concentrator is in contact with the extremities of the support via its parts 26.

Figure 5:
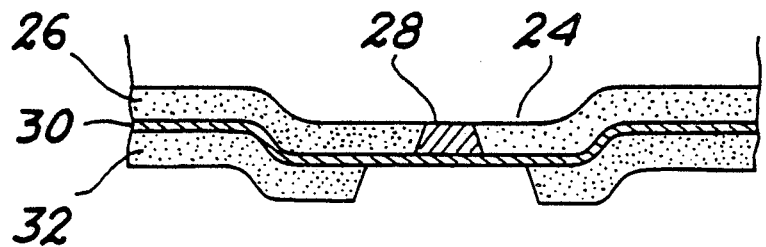
Figure 6:
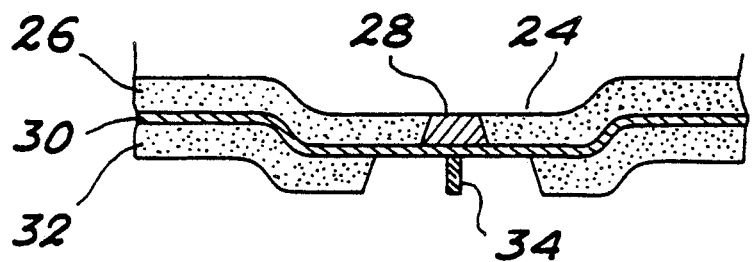
Figure 7:
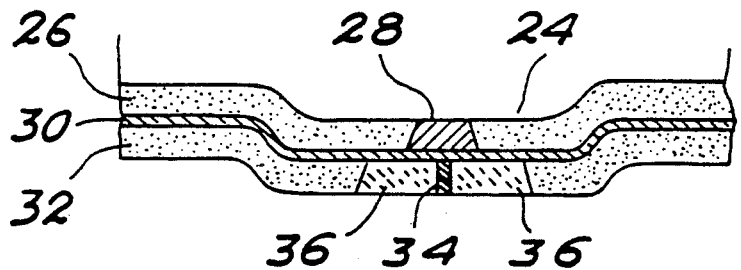

FIGS. 5 to 7 diagrammatically represent the stages for producing a reading and writing pole piece.

FIG. 5 represents the preliminary stages. A layer 30 with a thickness of about 500 Angströms of a non-magnetic conductive material is deposited on the flux concentrator. This material may be tungsten. The thickness of this non-magnetic layer 30 is such that it scarcely impedes the orientation of the field lines between the concentrator and the pole piece. Then a mask 32 made, for example, of $SiO_2$ is embodied partly covering the layer 30 of the non-magnetic conductive material. This mask delimits localization of the reading and writing pole piece.

FIG. 6 diagrammatically represents the result of the production of the non-magnetic spacer of the pole piece. This non-magnetic spacer 34 has a width of between 0.2 to 1 micrometers and is made of $SiO_2$, for example.

In order to produce this spacer, an engraving is made in resin deposited on the non-magnetic conductive layer 30. This engraving has the width of the spacer 34. Then, the $SiO_2$ is deposited into the engraving and the resin is eliminated.

The non-magnetic spacer 34 is positioned roughly under the non-magnetic wall 28 of the flux concetrator.

The result of the final stage for producing the pole piece is diagrammatically represented on FIG. 7. A layer of a magnetic material, such as FeNi, is deposited by electrolysis, for example. The layer 30 then serves as an electrode for electrolysis. Thus, the two magnetic parts 36 of the reading and writing pole piece are embodied. This layer of a magnetic material has a thickness of about from 1 to 5 micrometers, for example.

The lithographic masking method used to define the shape of the pole piece makes it possible to obtain a width corresponding to a track width possibly ranging from 1 to 10 micrometers, depending on the case involved. Moreover, the two magnetic parts 36 of the pole piece are self-aligned: thus they do not present any leakage in the field lines. By means of this method, the width of the track is defined with greater precision. These advantages thus avoid undershoot signals at the time information is read or written.

Figure 8:
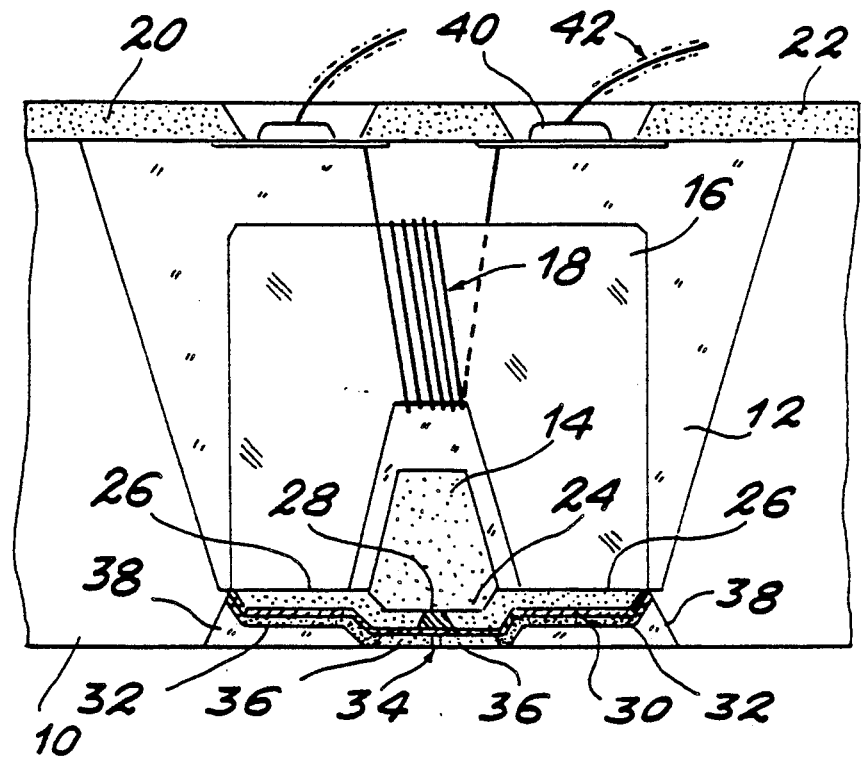

FIG. 8 diagrammatically represents a longitudinal section of a device according to the invention.

The catamaran-type profile has been engraved by means of a method well-known by experts in this field (reticular engraving, for example). The silicon plate has been cut. The various bases are separated from each other. The magnetic circuit is found self-positioned inside the hole 12 and fixed by the meltable glass, for example. The rear face 20 is covered with a protective layer made, for example, of aluminum. Spaces are made around the electric connections of the winding 18. This allows for easy connection by, for example, $SiO_2$ glass welding to the electric wires 42.

On the front face 10, it can be seen that the reading and writing pole piece and the flux concentrator are maintained and fixed by a material 38 suitable for welding, such as meltable glass.

Before cutting of the plate, the front face 10 has been honed so as to ensure its evenness.

Figure 9:
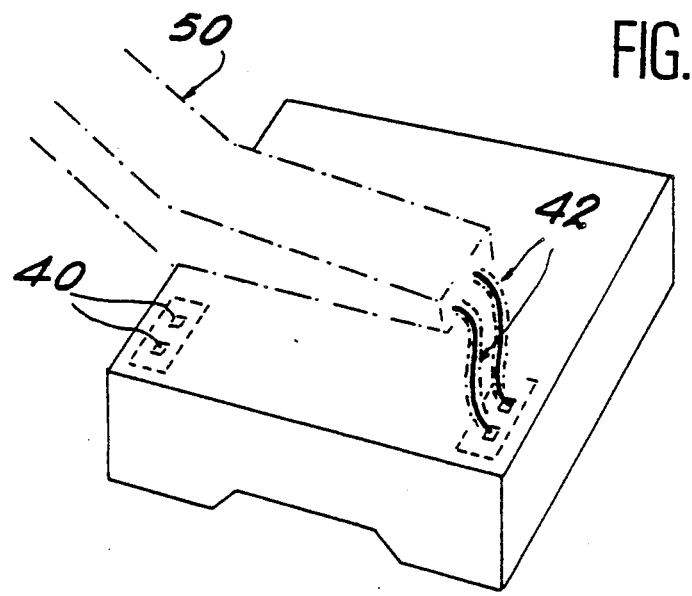
FIG. 9 shows a perspective view of a base supporting two writing/reading heads according to the invention.

FIG. 9 diagrammatically represents a base supporting two reading and writing heads according to the invention. The base is secured to an arm 50 which allows for the electric wires 42 connected to one of the devices.

A base includes two devices according to the invention. One of the two is used only if the other one fails to function properly.

What is claimed is:

1. A device for reading and writing information on a magnetic medium, comprising at least one magnetic writing and reading head on a monocrystalline silicon base, said base having a catamaran-type profile and having a front face intended to be opposite said magnetic medium and a rear face, the front and rear faces being oriented according to the crystallographical plan 100 of silicon wherein the magnetic reading and writing head comprises:

means defining at least one hole in the rear face of the base, said hole having a bottom and walls slanted according to the crystallographical planes 111 of the silicon;

a magnetic circuit seated in said hole, said circuit having a pair of spaced-apart extremities between said walls and facing the front face of the base, and a pair of electrical connections;

a magnetic flux concentrator in contact with the magnetic circuit extremities;

a non-magnetic electrically conductive layer covering said flux concentrator;

a masking layer covering said conductive layer except at a selected area thereof; and a writing and reading pole piece contacting said conductive area in said selected area thereof, said pole piece being substantially flush with the front face of the base.

2. The device according to claim 1 wherein the flux concentrator comprises a layer of magnetic material and a wall of non-magnetic material separating said magnetic material layer into two sections.

3. The device according to claim 1 wherein the layer of magnetic material is of FeSiAl and the layer of non-magnetic material is of $SiO_2$.

4. The device according to claim 1 wherein the writing and reading pole piece comprises a layer of magnetic material and a non-magnetic spacer separating said magnetic material layer into two sections.

5. The device according to claim 4 wherein the layer of magnetic material comprising the pole piece is of FeNi and the non-magnetic spacer is of $SiO_2$.

6. The device according to claim 1 and further including an insulating protective layer covering the rear face of the base except around said electrical connections.

7. The device according to claim 6 wherein said protective layer is selected from the group consisting of aluminum and insulating metal oxides.

8. The device according to claim 1 and further including means for fixing the magnetic circuit in said hole and for fixing the flux concentrator and pole piece to said base, said fixing means being selected from the group consisting of meltable glass and duroplastic polymers.

9. The device according to claim 1 wherein the masking layer is of $SiO_2$.

10. The device according to claim 1 wherein the non-magnetic conductive layer is of tungsten.

11. The device according to claim 1 and further including stop means at the bottom of said hole, said stop means having walls slanted according to the crystallographical planes 111 of the silicon.

12. The device according to claim 1 and further including connection means at the rear face of said base and connected electrically to said pair of electrical connections.

* * * * *